US012694430B2

(12) United States Patent
Ghose et al.

(10) Patent No.: US 12,694,430 B2
(45) **Date of Patent: *Jul. 28, 2026**

(54) SYSTEM FOR SEAMLESSLY STITCHING FULLY CONTEXTUAL ADS TO CONTENT FOR IMMERSIVE ADVERTISING

(71) Applicant: ANOKI, INC., San Carlos, CA (US)

(72) Inventors: Susmita Ghose, Mountain View, CA (US); Ashutosh Chaubey, Chhattisgarh (IN); Sartaki Sinha Roy, Uttarpara (IN); Anoubhav Agarwaal, Karnataka (IN); Aayush Agrawal, Madhya (IN)

(73) Assignee: ANOKI, INC., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,334

(22) Filed: Feb. 19, 2024

(65) Prior Publication Data

US 2025/0265620 A1    Aug. 21, 2025

(51) Int. Cl.
*G06Q 30/0241* (2023.01)
*G06Q 30/0251* (2023.01)
(Continued)

(52) U.S. Cl.
CPC ..... *G06Q 30/0276* (2013.01); *G06Q 30/0251* (2013.01); *G06Q 30/0277* (2013.01); *H04N 21/23418* (2013.01); *H04N 21/812* (2013.01)

(58) Field of Classification Search
None
See application file for complete search history.

(56) References Cited

U.S. PATENT DOCUMENTS 9,031,974 B2    5/2015    Delgo et al.
9,508,011 B2    11/2016    Sharon et al.
(Continued)

OTHER PUBLICATIONS

E. Jonathan Vanian, "How the generative A.I. boom could forever change online advertising", retrieving from https://www.cnbc.com/2023/07/08/how-the-generative-ai-boom-could-forever-change-online-advertising.html, available on Jul. 8, 2023 (Year: 2023).*
(Continued)

*Primary Examiner* — Sam Refai
(74) *Attorney, Agent, or Firm* — UNGERMAN IP PLLC; Mark E. Ungerman

(57) ABSTRACT

A system for contextual modification of content based on multimodal extraction of metadata from the content, wherein the metadata is extracted by processing one or more scenes in the content to extract metadata corresponding to multiple extraction modes, and an embedding model for each extraction mode wherein an aggregated embedding model responsive to the extracted metadata for each mode formulates an aggregated embedding. A process controller may include an embedding extractor responsive to a control input. The control input may specify one or more features appearing in the content defining a content modification opportunity. The embedding extractor may include an embedding model coordinated with the embedding model for one or more of the embedding modes to generate an opportunity embedding in the form of a vector. A vector comparison processor determines the distance between the opportunity embedding and the aggregated embedding, wherein the embeddings are in the form of vectors. The process controller is responsive to the vector comparison processor to generate edit control instructions indicating a modification of the content upon detection of the content modification opportunity. A content editor is responsive to the edit control instructions to modify the content. The (Continued)

content editor uses generative AI techniques to modify the content by replacing an element appearing within the content during the content modification opportunity with an element correlated with the element appearing in said content.

18 Claims, 7 Drawing Sheets

(51) Int. Cl.
　　*H04N 21/234*　　　(2011.01)
　　*H04N 21/81*　　　　(2011.01)

(56) References Cited

U.S. PATENT DOCUMENTS

| | | | |
|---|---|---|---|
| 11,544,460 B1 | 1/2023 | Margolin | |
| 11,886,486 B2 | 1/2024 | Mennicken et al. | |
| 12,380,484 B1 | 8/2025 | Chaturvedi et al. | |
| 2009/0006375 A1 | 1/2009 | Lax et al. | |
| 2010/0040341 A1 | 2/2010 | Yeh, Jr. | |
| 2011/0225136 A1 | 9/2011 | Tu et al. | |
| 2013/0259375 A1 | 10/2013 | Dunlop et al. | |
| 2014/0337875 A1 | 11/2014 | Dankberg et al. | |
| 2016/0148650 A1 | 5/2016 | Laksono | |
| 2016/0170582 A1 | 6/2016 | Nag et al. | |
| 2016/0322628 A1 | 11/2016 | Lee et al. | |
| 2016/0342628 A1 | 11/2016 | Van Rest et al. | |
| 2019/0104331 A1 | 4/2019 | Bapna et al. | |
| 2019/0182565 A1 | 6/2019 | Hitching et al. | |
| 2020/0004759 A1 | 1/2020 | Brebner | |
| 2020/0151387 A1 | 5/2020 | Choi et al. | |
| 2020/0273090 A1 | 8/2020 | Ayush et al. | |
| 2020/0311102 A1 | 10/2020 | Gratz et al. | |
| 2021/0103594 A1 | 4/2021 | Astretsov et al. | |
| 2021/0216920 A1 | 7/2021 | Mimassi | |
| 2021/0326599 A1 | 10/2021 | Jain et al. | |
| 2022/0309229 A1* | 9/2022 | Walters | G06N 3/08 |
| 2023/0095692 A1 | 3/2023 | Hong et al. | |
| 2023/0106483 A1 | 4/2023 | Sinn et al. | |
| 2023/0134852 A1 | 5/2023 | Lee | |
| 2023/0305822 A1* | 9/2023 | Ferrucci | G06N 20/00 |
| 2024/0031655 A1 | 1/2024 | Xu et al. | |
| 2024/0046318 A1* | 2/2024 | Muriqi | G06Q 20/389 |
| 2024/0062019 A1 | 2/2024 | Aberle | |
| 2024/0135514 A1* | 4/2024 | Pakhomov | G06T 5/60 |
| 2024/0187664 A1 | 6/2024 | Honma et al. | |
| 2024/0273344 A1 | 8/2024 | Naccari et al. | |
| 2024/0310975 A1 | 9/2024 | Narayanan et al. | |
| 2024/0329795 A1 | 10/2024 | Dehkordi et al. | |
| 2024/0340480 A1 | 10/2024 | Docherty et al. | |
| 2024/0378858 A1 | 11/2024 | Ackerman et al. | |
| 2025/0077496 A1 | 3/2025 | Skelton | |
| 2025/0156896 A1 | 5/2025 | Nandi et al. | |

OTHER PUBLICATIONS

Boesch, Gaudenz, Segment Anything Model (SAM)—The Complete 2024 Guide, Deep Learning, Dec. 28, 2023, p. 6, viso.ai, retrieved Aug. 28, 2024 from https://viso.ai/deep-learning/segment-anything-model-sam-explained.

Gal, et al., An Image is Worth One Word: Personalizing Text-to-Image Generation Using Textual Inversion, pp. 26.

Gordon-Smith, Michael, Digital Platforms Inquiry Final Report, Australian Competition and Consumer Commission, Jun. 2019, pp. 4, Australian Publishers Association, Australia.

Reed, et al., A Generalist Agent, GATO by Google DeepMind, May 12, 2022, pp. 3, Google, retrieved Aug. 29, 2024 from https://deepmind.google/discover/blog/a-generalist-agent.

Wikipedia, Advertising Network, Wikipedia the Free Encyclopedia, pp. 3, retrieved Aug. 22, 2023 from https://en.wikipedia.org/wiki/Advertising_network.

Wikipedia, Artificial Intelligence, Wikipedia, the free encyclopedia, pp. 20, retrieved on Aug. 22, 2023 from https://en.wikipedia.org/wiki/Artificial_Intelligence.

Wikipedia, Foundation Models, Wikipedia, the free encyclopedia, pp. 2, retrieved on Sep. 20, 2023 from https://en.wikipedia.org/wiki/Foundation-models.

Wikipedia, Free ad-supported streaming television, Wikipedia, the free encyclopedia, pp. 1, retrieved on Oct. 11, 2023 from https://en.wikipedia.org/wiki/Free_ad-supported_streaming_television.

Wikipedia, Generative artificial intelligence, Wikipedia, the free encyclopedia, pp. 4, retrieved on Aug. 22, 2023 from https://en.wikipedia.org/wiki/Generative_artificial_intelligence#Robot_actions.

Wikipedia, Online advertising, Wikipedia, the free encyclopedia, pp. 10, retrieved Aug. 22, 2023 from https://en.wikipedia.org/wiki/Online_advertising.

Wikipedia, Targeted advertising, Wikipedia, the free encyclopedia, pp. 9, retrieved Aug. 22, 2023 from https://en.wikipedia.org/wiki/Targeted_advertising.

* cited by examiner

SYSTEM FOR SEAMLESSLY STITCHING FULLY CONTEXTUAL ADS TO CONTENT FOR IMMERSIVE ADVERTISING

CROSS REFERENCE TO RELATED APPLICATIONS

This application is related to U.S. application Ser. No. 18/581,328, filed on Feb. 19, 2024, U.S. application Ser. No. 18/581,329, filed on Feb. 19, 2024, US application Ser. No. 18/581,330, filed on Feb. 19, 2024, U.S. application Ser. No. 18/581,332, filed on Feb. 19, 2024, U.S. application Ser. No. 18/581,333, filed on Feb. 19, 2024, U.S. application Ser. No. 18/581,335, filed on Feb. 19, 2024, and U.S. application Ser. No. 18/581,336, filed on Feb. 19, 2024, the disclosures of all of which are incorporated by reference herein.

BACKGROUND OF THE INVENTION

1. Field of the Invention

The invention relates to a video content processing system and more particularly to a content-based search of contextual data representing video content.

2. Description of the Related Technology

Online advertising is a form of marketing and advertising that uses the Internet to promote products and services to audiences and platform users. Advertisements are increasingly being delivered via automated software systems operating across multiple websites, media services, and platforms, known as programmatic advertising.

Online advertising often involves a publisher, who integrates advertisements into its online content, and an advertiser, who provides the advertisements to be displayed on the publisher's content. Other potential participants include advertising agencies that help generate and place the ad copy, and an ad server that delivers and tracks the advertising activity.

Many common online advertising practices are controversial and, as a result, have become increasingly subject to regulation. Many internet users also find online advertising disruptive and have increasingly turned to ad blocking for a variety of reasons. Online ad revenues also may not adequately replace other publishers' revenue streams.

Display advertising conveys its advertising message visually using text, logos, animations, videos, photographs, or other graphics. The goal of display advertising is to obtain more traffic, clicks, or popularity for the advertising brand or organization. Display advertisers frequently target users to increase the ads' effect.

Web banners or banner ads typically are graphical ads displayed within a web page. Many banner ads are delivered by a central ad server.

The online advertising process may involve many parties. In the simplest case, the website publisher selects and serves the ads. Publishers that operate their advertising departments may use this method. Alternatively, ads may be outsourced to an advertising agency, and served from the advertising agency's servers or ad space may be offered for sale in a bidding market using an ad exchange and real-time bidding, known as programmatic advertising.

Programmatic advertising involves automating the sale and delivery of digital advertising on websites and platforms via software rather than direct human decision-making. Advertisements are selected and targeted to audiences via ad servers which often use cookies, which are unique identifiers of specific computers, to decide which ads to serve to a particular consumer. Cookies can track whether a user left a page without buying anything, so the advertiser can later retarget the user with ads from the site the user visited.

As advertisers collect data across multiple external websites about a user's online activity, they can create a detailed profile of the user's interests to deliver even more targeted advertising. This aggregation of data is called behavioral targeting. Advertisers also target their audience by using contextual cues to deliver ads related to the content of the web page where the ads appear. Retargeting, behavioral targeting, and contextual advertising all are designed to increase an advertiser's return on investment over untargeted ads.

Customer information is combined and returned to the supply-side platform creates and provides ad offers to an ad exchange. The ad exchange puts the offer out for bid to demand-side platforms. Demand-side platforms act on behalf of ad agencies that sell ads. Demand-side platforms have ads ready to display and are searching for users to view them. Bidders get the information about the user ready to view the ad and decide, based on that information, how much to offer to buy the ad space. An ad exchange picks the winning bid and informs both parties. The ad exchange then passes the link to the ad back through the supply side platform and the publisher's ad server to the user's browser, which then requests the ad content from the agency's ad server.

Interstitial ads: An interstitial ad displays before a user can access requested content, sometimes while the user is waiting for the content to load. Interstitial ads are a form of interruption marketing.

Content marketing is any marketing that involves the creation and sharing of media and publishing content to acquire and retain customers. This information can be presented in a variety of formats, including blogs, news, videos, white papers, e-books, infographics, case studies, how-to guides, and more.

Ad blocking, or ad filtering is a technology that may be used to block advertising.

An online advertising network or ad network is a company that connects advertisers to websites that want to host advertisements. The key function of an ad network is an aggregation of ad supply from publishers and matching it with the advertiser's demand. The phrase "ad network" by itself is media-neutral in the sense that there can be a "Television Ad Network" or a "Print Ad Network" but is increasingly used to mean "online ad network" as the effect of aggregation of publisher ad space and sale to advertisers is common in the online space. The fundamental difference between traditional media ad networks and online ad networks is that online ad networks use a central ad server to deliver advertisements to consumers (ad serving), which enables targeting, tracking, and reporting of impressions in ways not possible with analog media alternatives.

Targeted networks focus on specific targeting technologies such as behavioral or contextual, that have been built into an ad server. Targeted networks specialize in using consumer clickstream data to enhance the value of the inventory they purchase. Further specialized targeted networks include social graph technologies which attempt to enhance the value of inventory using connections in social networks. Significant targeting methods include behavioral targeting, contextual targeting, and creative optimization by using experimental or predictive methods to explore the optimum creative for a given ad placement and exploiting that determination in further impressions.

Artificial intelligence (AI) is the intelligence of machines or software, as opposed to the intelligence of human beings or animals.

Machine learning is the study of programs that can improve their performance on a given task automatically. It has been a part of AI from the beginning.

There are several kinds of machine learning. Unsupervised learning analyzes a stream of data, finds patterns, and makes predictions without any other guidance. Supervised learning requires a human to label the input data first and comes in two main varieties: classification (where the program must learn to predict what category the input belongs in) and regression (where the program must deduce a numeric function based on numeric input). In reinforcement learning the agent is rewarded for good responses and punished for bad ones. The agent learns to choose responses that are classified as "good". Transfer learning is when the knowledge gained from one problem is applied to a new problem. Deep learning uses artificial neural networks for these types of learning.

Natural language processing (NLP) allows programs to read, write, and communicate in human languages such as English. Specific problems include speech recognition, speech synthesis, machine translation, information extraction, information retrieval, and question answering.

Modern deep learning techniques for NLP include word embedding (how often one word appears near another), transformers (which finds patterns in text), and others. Feature detection helps AI compose informative abstract structures out of raw data.

Machine perception is the ability to use input from sensors (such as cameras, microphones, wireless signals, active lidar, sonar, radar, and tactile sensors) to deduce aspects of the world. Computer vision is the ability to analyze visual input. The field includes speech recognition, image classification, facial recognition, object recognition, and robotic perception.

Deep learning uses several layers of neurons between the network's inputs and outputs. The multiple layers can progressively extract higher-level features from the raw input. For example, in image processing, lower layers may identify edges, while higher layers may identify the concepts relevant to a human such as digits, letters, or faces.

Generative artificial intelligence (AI) is artificial intelligence capable of generating text, images, or other media, using generative models. Generative AI models learn the patterns and structure of their input training data and then generate new data that has similar characteristics. A generative AI system is constructed by applying unsupervised or self-supervised machine learning to a data set. The capabilities of a generative AI system depend on the modality or type of the data set used.

A foundation model (also called base model) is a large machine learning (ML) model trained on a vast quantity of data at scale (often by self-supervised learning or semi-supervised learning) such that it can be adapted to a wide range of downstream tasks. Foundation models can in turn be used for task and/or domain-specific models using targeted datasets of various kinds. Beyond text, several visual and multimodal foundation models have been produced—including DALL-E, Flamingo, Florence, and NOOR. Visual foundation models (VFMs) have been combined with text-based LLMs to develop sophisticated task-specific models. There is also Segment Anything by Meta AI for general image segmentation. For reinforcement learning agents, there is GATO by Google DeepMind.

Foundation models may be further developed through additional training. A foundation model is a "paradigm for building AI systems" in which a model trained on a large amount of unlabeled data can be adapted to many applications. Foundation models are "designed to be adapted (e.g., finetuned) to various downstream cognitive tasks by pre-training on broad data at scale".

Key characteristics of foundation models are emergence and homogenization. Because training data is not labeled by humans, the model emerges rather than being explicitly encoded. Properties that were not anticipated can appear. For example, a model trained on a large language dataset might learn to generate stories of its own or to do arithmetic, without being explicitly programmed to do so. Furthermore, these properties can sometimes be hard to predict beforehand due to breaks in downstream scaling laws. Homogenization means that the same method is used in many domains, which allows for powerful advances but also the possibility of "single points of failure".

SUMMARY OF THE INVENTION

It is an object to provide a system that is computationally efficient yet allows for a deep understanding of content, including video and/or other content.

It is an object to provide a versatile system that may be used in different applications where machine understanding of content, including video and/or other content, is useful or required.

It is an object to provide a system capable of indexing content, including video and/or other content, according to multiple domains. It is a further object to provide a system where the indexing of video may be on a scene-by-scene basis and/or a frame-by-frame basis.

It is an object to provide a system that utilizes a deep understanding of video content to provide contextual advertising. Contextual advertising is more relevant to the content and thus likely to be more relevant to a user who elects to view the content. Contextual advertising is more effective than advertising untethered to the content and thus more valuable to the advertiser. A system that can enrich content, using rich metadata, may provide the viewer with an enhanced viewing experience. This increases engagement. The ability to understand the content being consumed by a viewer enables recommendations of similar content and enables superior advertiser value propositions for increased monetization. This can provide better fill rates and higher CPMs for advertisement placements.

An example of utilizing the system for contextual advertising:

Consider a user who is watching content with a high-speed car chase. The advertising provided immediately following the car chase scene can be selected to be consistent with the scene. For example, an advertisement may be presented for a sports car immediately following a high-speed chase. The selection of a Porsche advertisement immediately for placement after a high-speed car scene involving a Porsche is even more relevant.

The enriched metadata may also indicate that the high-speed chase involving a Porsche ends in a fiery crash in which case it may be better for an agency placing Porsche advertisements to know that would be an inopportune moment to place a Porsche advertisement. Instead, it may be more opportune to provide a message relating to car safety.

For another example, when the content viewed relates to an infant, it may be appropriate to show an advertisement for relevant products such as car seats, diapers, baby formula, or other baby-related items.

For another example, restaurant advertisements may be served following content showing people dining in a restaurant. Similarly, insurance ads may be served following content showing natural disasters or other types of destruction.

The foregoing examples involve the presentation of an advertisement during a pre-established commercial break in the content provided or by interrupting the content at an appropriate juncture during the consumption of content. The system may use a deep understanding of the content reflected in the rich metadata to determine the point in the presentation of content to present an advertisement. For example, at the conclusion of a scene or the conclusion of a shot. The system also has the ability to understand the frequency and timing of commercial breaks and override scheduling based on determined conditions. For example, the system may accommodate logic to override an advertisement opportunity determined based on the content but is otherwise inappropriate or undesirable, for example, based on time constraints such as the opportunity following too closely after another opportunity.

Another modality for the use of the system is to modify the content by superimposing relevant messages in an automated fashion based on a deep understanding of the content reflective of the metadata which, in turn, is reflective of the scene. For example, during a scene that includes a baby smiling or otherwise expressing joy, an overlay may be provided to the content with a consistent advertising message. For example, "This happy baby moment is brought to you by Huggies". According to another example where content shows a relaxing moment with folks sitting around a fire, a pool, or in a lounge, the message may be "This moment is brought to you by Bud Light".

A deep understanding of the content can facilitate the presentation of the overlay. This can be accomplished by deciding if there is a suitable position on the screen during a shot for presenting the overlay. This involves a determination of a sufficiently sized area with a relatively low level of variations for a sufficient period of time during or near the relevant portion of the content. The rich metadata can also assist in selecting the color of the superimposed message. For example, the superimposed message should not be presented over content having similar coloring as the backdrop. The system may use AI techniques to alter the coloring of the superimposed image or to select an image to superimpose that has contrasting coloring to the backdrop. The system may also interface with an ad server and include in the identification of an ad opportunity, the particulars (size shape, background color, duration, and information describing the content) as part of a bid package, and the ad server may place advertisements through a competitive bid process where the advertiser/agency controls the bids and advertisement selection based on the particulars. The advertiser may thereby elect to limit the superimposition based on the particular colors. For example, Coca-Cola may have superimposed content in two versions: according to one version the superimposition is in red, and according to another version, the superimposition is white. Each may be suitable only for a limited range of background colors and the background color will inform the decision to place a particular advertisement superimposed on the content.

According to an advantageous feature, a multimodal metadata extraction system may be provided with a scene detector having a video content input and an output representing scene boundaries. The metadata extractor may be responsive to the content of a scene as identified by the scene boundaries to extract metadata corresponding to several, plural, or multiple extraction modes. A metadata embedding may be used for each of the modes.

An embedding aggregator response to the embedding operates to formulate an aggregated embedding for each scene thereby indexing the content of the scene. The output representing the identified scenes may be a set of video clips of each scene or an index to the video content corresponding to the identified scenes. The scene detector may include a frame analyzer for identifying consecutive frames having similar characteristics. A boundary detector may be provided to identify boundaries of consecutive frames having sufficiently similar characteristics that they likely belong to the same shot. An embedding system may be provided to formulate a composite distance matrix capturing the distance between shot embeddings. A temporal clustering system may be connected to the composite distance matrix. An output of the temporal clustering system identifies the scene boundaries of the content.

An embedding database may be connected to the embedding aggregator for storing the aggregated embedding for use as a search index for scenes identified in the content.

The multimodal metadata extraction system may be provided with extraction modes to adequately characterize the content. The particular extraction modes and several extraction modes may be by the application for which the metadata will be used. Extraction modes include at least one of audio (speech recognition, music recognition); image recognition (feature recognition with temporal understanding); text (caption, scene summarization, text recognition); and scene interpretation (sentiment, profanity, action level). Many other extraction modes may be implemented.

A system for contextual modification of content based on multimodal extraction of metadata from the content, wherein said metadata is extracted by processing one or more scenes in said content to extract metadata corresponding to multiple extraction modes, and an embedding model for each extraction mode wherein an aggregated embedding model responsive to said extracted metadata for each mode formulates an aggregated embedding including a process controller having an embedding extractor responsive to a control input wherein the control input specifies one or more features defining a content modification opportunity and wherein the embedding extractor includes an embedding model coordinated with the embedding model for one or more of the embedding modes to generate an opportunity embedding in the form of a vector. A vector comparison processor for determining the distance between the opportunity embedding and the aggregated embedding to determine a content modification opportunity. Wherein the process controller is responsive to the vector comparison processor to generate edit control instructions indicating a modification of the content upon detection of the content modification opportunity. A content editor is responsive to the edit control instructions to modify the content and have a modified content output.

The edit control instructions may cause the content editor to add an overlay to the content. A creative library to store one or more content overlays and the edit control instructions may specify an overlay for use by said content editor.

The edit control instructions may include an identification of an overlay stored in the creative library and the content editor may be connected to the creative library. The edit control instructions may include the overlay and the process controller may be connected to the creative library. The edit control instructions may include instructions for placement of the overlay in the modified content output.

The edit control instructions may include instructions for modification of the overlay in the modified content. The process controller may be responsive to the vector comparison processor to identify an indication of the position and duration of a content modification opportunity and may further include a modification selection server responsive to the opportunity to select a modification to apply to said content. The modification selection server may be a competitive bid processor.

The edit control instructions may cause the content editor to interrupt the content and add a set of additional frames to the content during the interruption. A creative library may store one or more sets of additional frames and the edit control instructions may specify a set of additional frames for use by the content editor.

The edit control instructions may include an identification of a set of additional frames stored in the creative library and the content editor may be connected to the creative library. The edit control instructions may include the set of additional frames and the process controller may be connected to the creative library. The edit control instructions may include instructions for placement of the set of additional frames in the modified content output. The process controller may be responsive to the vector comparison processor to identify the time of insertion of the set of additional frames.

The process controller may be responsive to the vector comparison processor to identify the location of a content modification opportunity and a modification selection server responsive to the opportunity to select a modification to apply to said content. The modification selection server may be a competitive bid processor.

It is an object to provide a system that can provide dynamically customized contextual advertising and/or generated creatives using Gen AI techniques. It is a feature to modify creatives based on context. The context may include information relating to the viewer and information relating to the content. Where context includes viewer information, a viewer database may be provided which includes demographics, viewing history, and other information concerning the viewer or the viewer's household. The contextual information may be stored by cross-referencing a viewer identification with the scene embeddings 503 or content identification of content viewed. Having a deep understanding of the content a viewer has previously viewed allows the generation of creatives based on the user. For example, a creative may be generated featuring a San Francisco resident listening to NPR driving a Tesla on the Golden Gate Bridge, and drinking a certain Kombucha brand may be created on the fly to follow a scene with San Francisco in the background where the viewer information indicates the viewer is a Silicon Valley executive. Different creatives may be generated for different viewers or default creatives may be utilized where a viewer does not match the parameters of an identified advertising opportunity.

According to another feature, a creative may be modified based on the content being viewed. For example, if the rich metadata indicates that the scene is set in San Francisco, a creative may be presented during an advertising break showing San Francisco as the backdrop. If the content indicated that the scene was set in New York City, a creative may be generated using New York City as the backdrop. In this way, the main video content may be utilized to dynamically create or modify a creative for insertion as an advertisement.

A system for contextual modification of media content based on multimodal extraction of metadata from the media, wherein the metadata is extracted by processing one or more scenes in the media to extract metadata corresponding to multiple extraction modes, and an embedding model for each extraction mode wherein an aggregated embedding model responsive to the extracted metadata for each mode formulates an aggregated embedding including a process controller having an embedding extractor responsive to a control input wherein the control input specifies one or more features defining a media modification opportunity and wherein the embedding extractor includes an embedding model coordinated with the embedding model for one or more of the embedding modes to generate an opportunity embedding in the form of a vector. A vector comparison processor for determining the distance between the opportunity embedding and the aggregated embedding to determine a media modification opportunity wherein the process controller is responsive to the vector comparison processor to generate edit control instructions indicating a modification of the media upon detection of the media modification opportunity. A media content editor may be responsive to the edit control instructions to modify the media and have a modified media output wherein the media content editor uses generative AI techniques to modify the media content.

The system may include a creative library, wherein the creative library stores one or more template creatives, and the edit control instructions specify the generative AI techniques to the template creative retrieved from the creative library application for use by the media content editor. The edit control instructions may cause the media content editor to apply generative AI techniques based on triggering embeddings. The edit control instructions may include triggering embeddings. The triggering embeddings may be based in part on the aggregated embeddings. The triggering embeddings may be based in part on metadata concerning viewers, and further including a viewer database for viewer metadata. The edit control instructions may be dynamically generated based on the viewer database and scene content embeddings in the modified media content. A modification selection server may be responsive to the opportunity to select a modification to apply to the media. The modification selection server may be a competitive bid processor.

It is an object to provide fully immersed advertising in video content. It is an object to use artificial intelligence techniques to allow an advertiser to identify an opportunity to provide artificial product placement in a scene. A user may specify advertising opportunities by providing instructions reflective of the opportunity that they are looking for. For example, the user may designate the occurrence of an actor holding a beverage as an opportunity. The system may establish a search vector to identify a scene, shot, or frame that includes an actor holding a beverage container. The distance between the search vector and content embedding indicates the presence of the opportunity in video content. Once a scene is identified, the system may utilize generative AI techniques to edit the content. For example, to replace a beverage container in the content with another object (or no object). One option is to replace a beverage container with a sponsored beverage container. Generative AI may be utilized to replace the beverage container with a branded container in order to establish artificially created product placements. The system is not limited to advertisements. For example, the system may specify a search for any kind of element and use generative AI techniques to replace such an element. The system may be instructed to locate occurrences of a protagonist smoking a cigarette and use generative AI techniques to eliminate the cigarette or to change the cigarette to something else, for example, a lollypop, and may be set to delete any smoke.

An alternative implementation may be to insert into the content, for example at the end of a scene some, extra frames essentially replicating the frames that have the beverage container except for using the generative AI techniques to artificially modify the frames to include the desired product placement. In this way, the content frames remain intact, but the system allows the insertion of an advertisement that appears seamlessly as part of the content. Generative AI techniques are available for performing such modifications. Another implementation is to edit the video content by inserting a creative immediately after the scene. The creative might be a sponsored advertisement suggested by the opportunity. In general, it is an object to provide a system that identifies scene modification opportunities. The scene modification opportunities are specified by a set of conditions and such conditions are utilized to establish a search vector. The conditions may be specified by media input or other instructions. The input may be generated by a user or may be driven by a content inventory.

One aspect of the content inventory may be an advertisement inventory. In this scenario, the advertisement inventory may be represented by a set of "creatives". The creatives might be any kind of content that the user wants incorporated into a video content. Consider the example where the inventory includes an advertisement for a London Fog brand overcoat. The advertisement includes a scene with a man on a rainy night walking under a streetlight. Another creative in the inventory might be a soft drink advertisement featuring teens frolicking at the beach. A third creative in the inventory might be for a brand of beer featuring people at a football stadium.

The inventory may be processed as search media to generate search vectors. The search vectors may be compared to scene embeddings generated from video content by a multimodal metadata extractor. If the video content includes a scene that is like a creative in the inventory, the corresponding creative may be inserted into the video content at the end of the identified scene. Similarity is indicated by the distance between a search vector generated from the creative and the scene embeddings generated by a multimodal metadata extractor.

A system for contextual modification of content based on multimodal extraction of metadata from the content, wherein the metadata is extracted by processing one or more scenes in the content to extract metadata corresponding to multiple extraction modes, and an embedding model for each extraction mode wherein an aggregated embedding model responsive to the extracted metadata for each mode formulates an aggregated embedding may include a process controller including an embedding extractor responsive to a control input wherein the control input may specify one or more features defining a media modification opportunity and wherein the embedding extractor may include an embedding model coordinated with the embedding model for one or more of the embedding modes to generate an opportunity embedding in the form of a vector. A vector comparison processor may be provided for determining the distance between the opportunity embedding and the aggregated embedding to determine a content modification opportunity. The process controller may be responsive to the vector comparison processor to generate edit control instructions indicating a modification of the content upon detection of the content modification opportunity. A content editor may respond to the edit control instructions for a content modification opportunity may modify the content and may have a modified content output wherein the content editor may use generative AI techniques to modify the content by replacing an element appearing within the content during the content modification opportunity with an element correlated with the element appearing in the content.

The element appearing during the content modification opportunity may represent an object that appears in one or more frames of the content wherein the element correlated with an element of the content may represent an alternative object and the generative AI technique may excise at least an area of one or more frames corresponding to the element and inserting the element correlated with the element appearing in the content in the one or more frames. The generative AI techniques may operate to fill any gaps between the element appearing within the content during the content modification opportunity and the element correlated with the element appearing in the content.

A creative library may be provided with one or more creative templates and the edit control instructions may specify the generative AI techniques to the creative template retrieved from the creative library application for use by the content editor. The edit control instructions may cause the media content editor to apply generative AI techniques based on triggering embeddings.

The edit control instructions may include triggering embeddings. The triggering embeddings may be based in part on the aggregated embeddings. The triggering embeddings may be based in part on metadata concerning viewers, and further include a viewer database for viewer metadata. The edit control instructions may be dynamically generated based on the viewer database and scene content embeddings in the modified content. The system may include a modification selection server responsive to the content modification opportunity to select a modification to apply to the content. The modification selection server may be a competitive bid processor. The element appearing during the content modification opportunity may represent an object that appears in one or more frames of the content and the element correlated with an element of the content may represent an alternative object and the generative AI techniques may insert one or more frames of modified content into the content at the content modification opportunity.

Various other objects, features, aspects, and advantages of the disclosed system will become more apparent from the following detailed description of preferred embodiments of the invention, along with the accompanying drawings in which the same numerals represent the same components across more than one figure.

Moreover, the above objects and advantages are illustrative, and not exhaustive, of those that can be achieved by the or with the system. Thus, these and other objects and advantages will be apparent from the description herein, both as embodied herein and as modified because of any variations that will be apparent to those skilled in the art.

DETAILED DESCRIPTION OF THE PREFERRED EMBODIMENT

Figure 1:
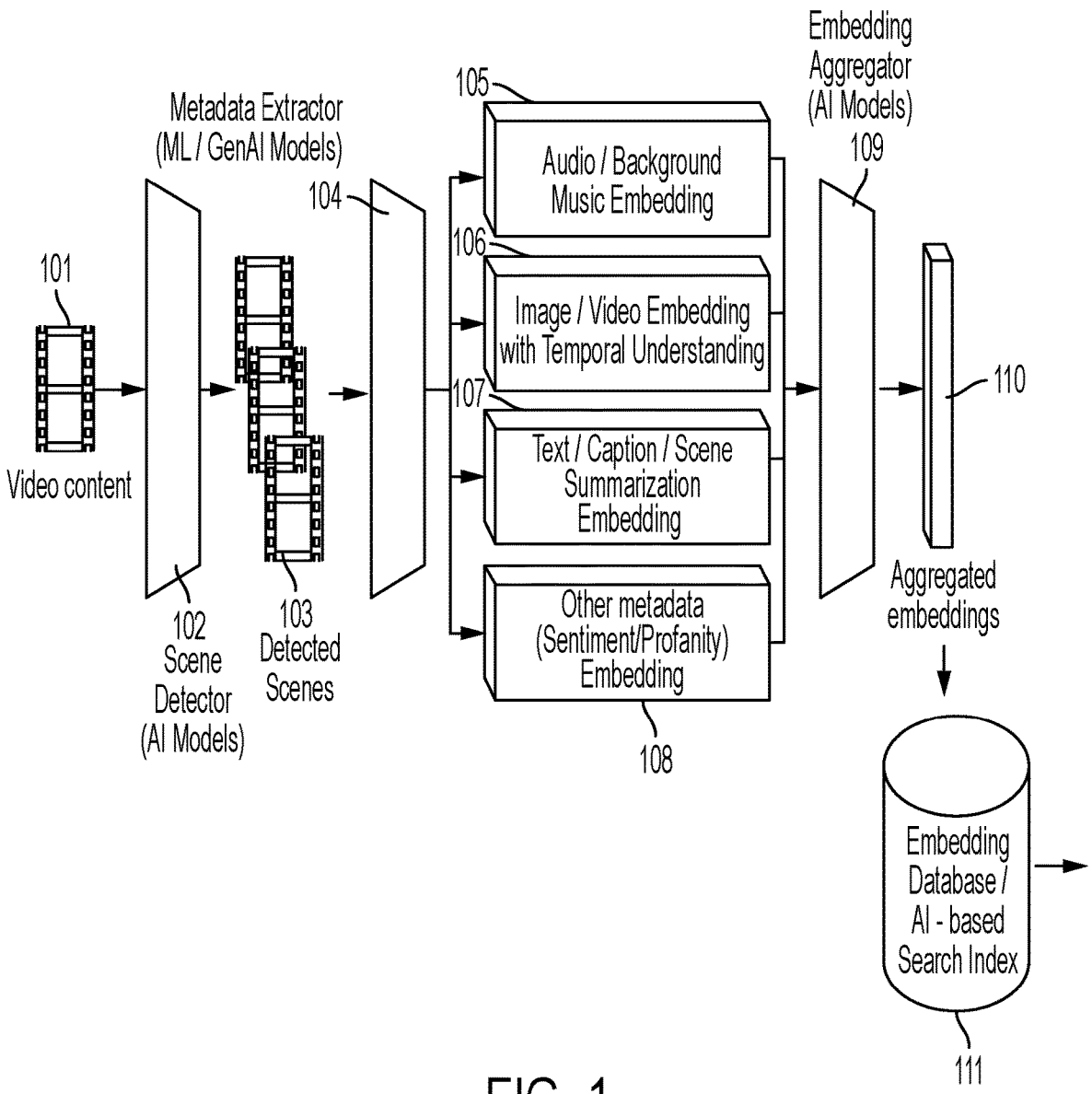
FIG. 1 shows a multimedia metadata extraction system.

Before the present invention is described in further detail, it is to be understood that the invention is not limited to the embodiments described, as such may, of course, vary. It is also to be understood that the terminology used herein is for the purpose of describing embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of exemplary methods and materials are described herein.

It must be noted that as used herein and in the appended claims, the singular forms "a", "an", and "the" include plural referents unless the context dictates otherwise.

All publications mentioned herein are incorporated herein by reference to disclose and describe the methods and/or materials in connection with which the publications are cited. The publications discussed herein are provided solely for their disclosure before the filing date of the present application. Nothing herein is to be construed as an admission that the present invention is not entitled to antedate such publication by prior invention. Further, the dates of publication provided may be different from the actual publication dates, which may need to be independently confirmed.

A system is provided for processing video content to gain a rich understanding of the video content. To effectively process the content and achieve sufficient computational efficiency, even using artificial intelligence (AI) techniques, a content stream may be divided into scenes made up of one or more segments of the content. Each segment is likely to correspond to a shot and is made up of one or more sequential frames having a high level of commonality. Two or more segments having a high level of commonality may be grouped together and processed as a single scene.

In content production, a "shot" is typically considered to be a continuous view captured by a single camera without interruption. A processor can identify continuous frames that are likely to be in the same groups of frames in a shot by examining local color distribution. These shots are identified as a segment of content. Similar shots (or segments) may be grouped into scenes. Similar shots are taken to be part of a scene. Shots having sufficient similarity in a scene are assumed to convey a homogeneous storyline or concept.

FIG. 1 shows a multimodal metadata extraction system with a video content input 101. The content input 101 is provided to a scene detector 102. The scene detector 102 operates to break a video content stream to smaller (or shorter) scenes. A video stream is made up of a series of frames. Frames of content can be grouped into segments based on commonality. Segments can also be grouped into scenes based on commonality.

Figure 2:
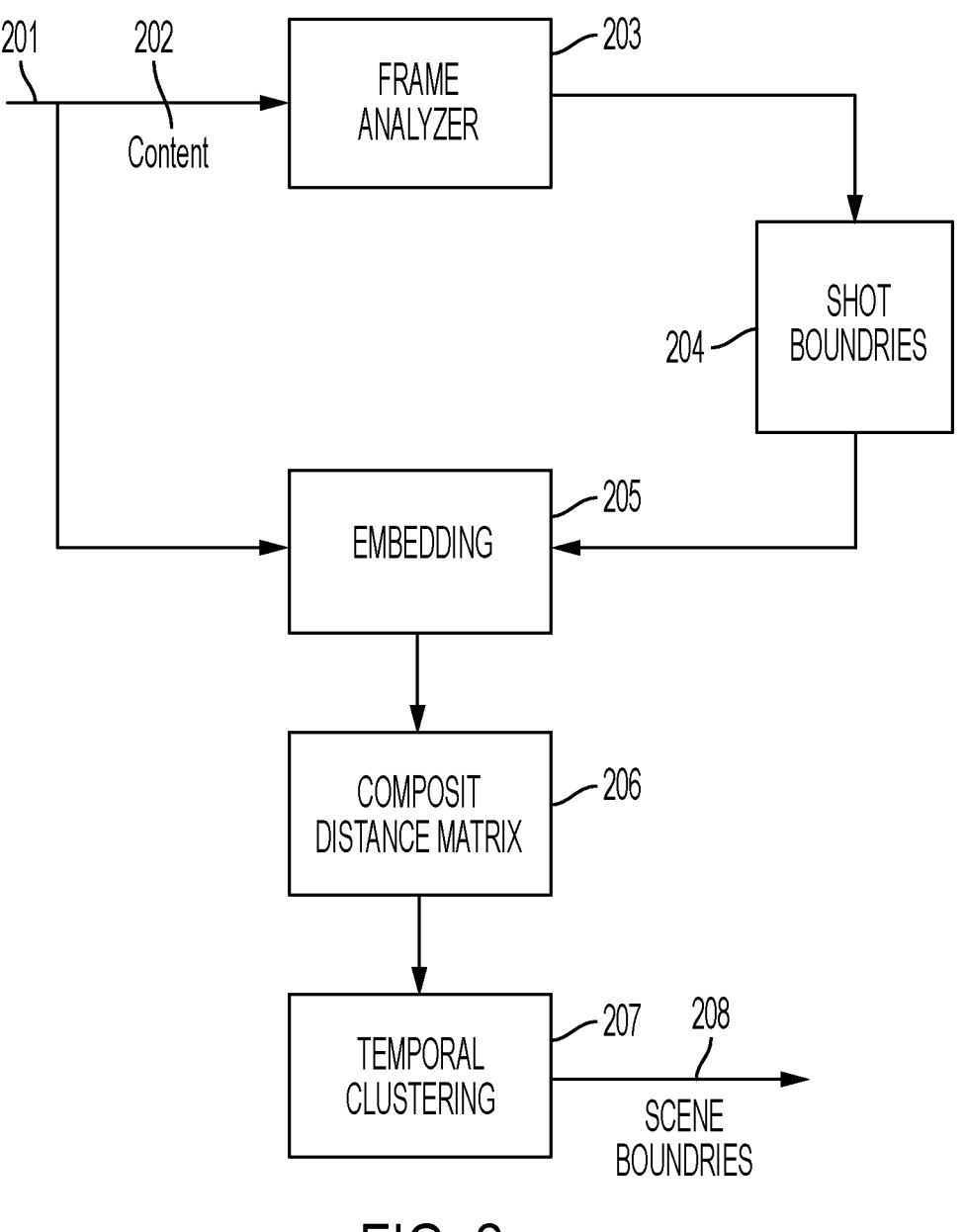
FIG. 2 shows the operation of a scene detector.

FIG. 2 shows the operation of scene detector 102. A content stream is provided to a stream analyzer for performing a frame-by-frame analysis to identify boundary frames for a series of consecutive frames having a high level of similarity. The frame-by-frame analysis may be performed by using significant average color distribution differences between consecutive frames. The shot boundaries may be stored in boundary table 204 and used to access the frames of a shot. The video content may be in content storage 206. Alternatively, the frames of a shot may be processed in a stream.

The frames of the shots are provided to embedding system 205. The embedding system may be implemented using a convolutional neural network or a Vision Transformer based on a Deep Learning image featurizer. The embedding system may generate a composite distance matrix 206 by capturing the distance between shot embedding based on a distance metric and potentially the temporal distance between shots.

Temporal clustering 207 based on dynamic programming is applied on the composite distance matrix 206 to group similar, shots together to obtain scene boundaries 208.

Scene boundaries 208 define the detected scenes 103. The detected scenes 103 are provided to a metadata extractor 104. The metadata extractor 104 considers the content of the scenes individually according to selected aspects anticipated to be potentially present in the content. FIG. 1 illustrates four aspects for processing and embedding. The aspects illustrated in FIG. 1 are examples, Audio/Background Music embedding 105, Image/Video embedding with temporal understanding 106, Text/Caption/Scene Summation embedding 107, and other metadata (sentiment profanity) 108. In practice, many more modes are contemplated. For example, location, time of day, weather, genre, etc.

The extraction frame level detail may include objects, logos, locations, sentiment, action detection, scene summarizer, etc. All the information is then encoded using an embedding model for every scene and a vector search index for each scene is then built. This allows for free-form, contextual, and detailed video indexing/searches for example the metadata for "a romantic scene with a glass of wine by a lake" can be easily identified.

The embeddings are provided to an embedding aggregator 109 to generate aggregated embeddings 110. The aggregated embeddings may be stored in an embedding database 111.

Figure 3:
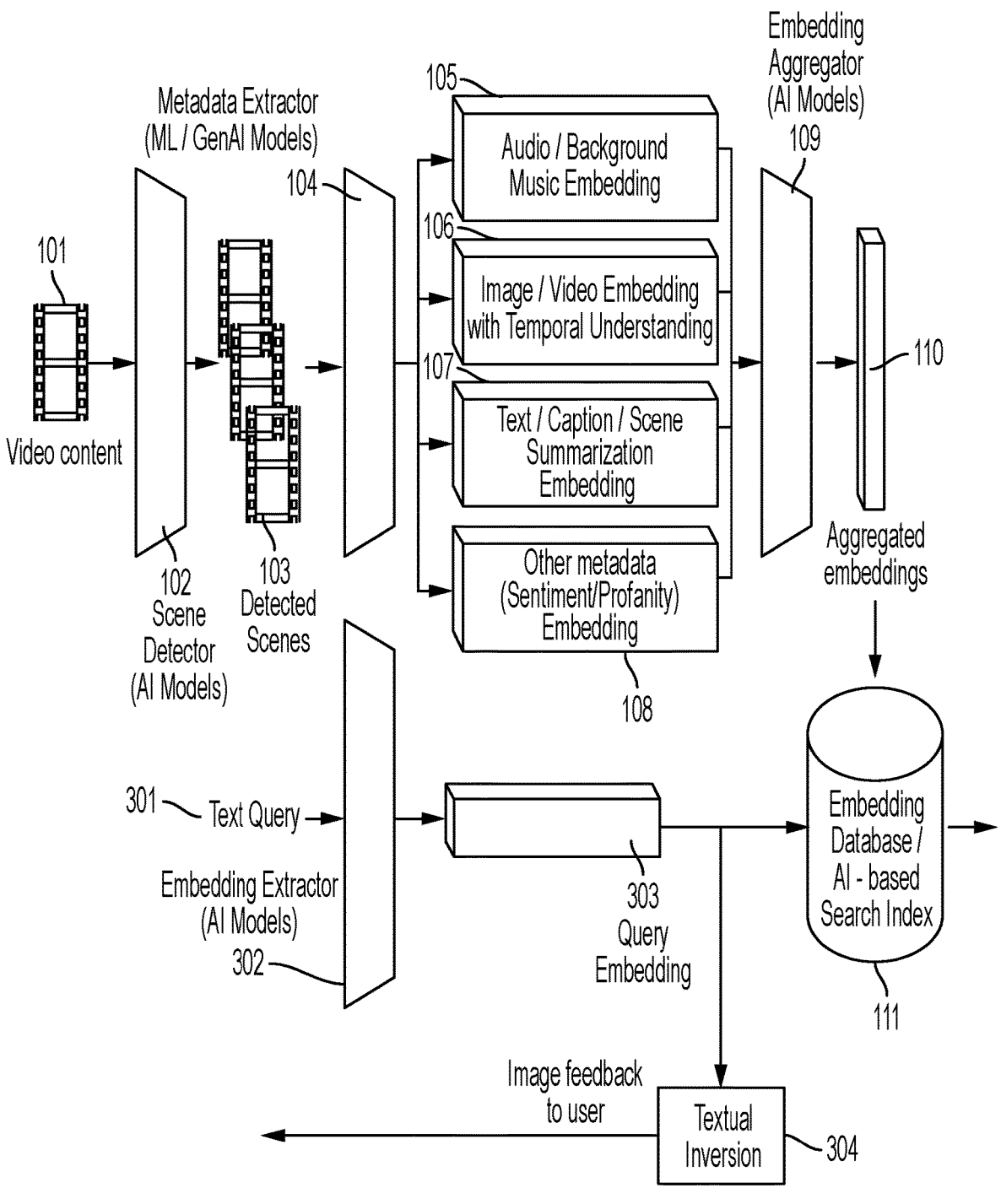
FIG. 3 shows a text-based query system.

FIG. 3 shows a text-based query system for searching a database of video content metadata. As shown in FIG. 3, the metadata obtained by multimodal extraction, as shown in FIGS. 1 and 2, may be generated in advance and stored in a database. Alternatively, the query may be formulated as described herein and applied against a stream of multimodal extracted metadata in real-time or near real-time.

A text query 301 is encoded by embedding extractor 302. The query mode must correspond to one of the mode embeddings used to extract metadata. While the contemplated search is presented as text, the text can be used to search text-compatible modal extractions.

In its simplest form, the text query can search for corresponding text appearing in the content. The query embedding 303 (SG: The following description is of the text query searching across multiple embedding modes. Please let me know how this is done (or if something different is happening.)) creates a search vector across text-compatible modes. For another example, the location mode may be based on image recognition and if successful may recognize a city. Many cities have unique landmarks that may appear in the content and be recognizable. For example, landmarks like the Arc de Triomphe, the Louvre, or Eiffel Tower signify Paris France; the Empire State Building, UN, or Radio City signify New York.

The query embedding 303 is used to generate a search vector to be applied against the extractions used to index the content in order to find similar embeddings and the relevant scenes are returned (or identified). This allows for free-form, contextual, and detailed video searches, for example, "a romantic scene with a glass of wine by a lake" can be easily searched. Such searches can be used to identify occurrences in the video content, stored or streamed.

Figure 4:
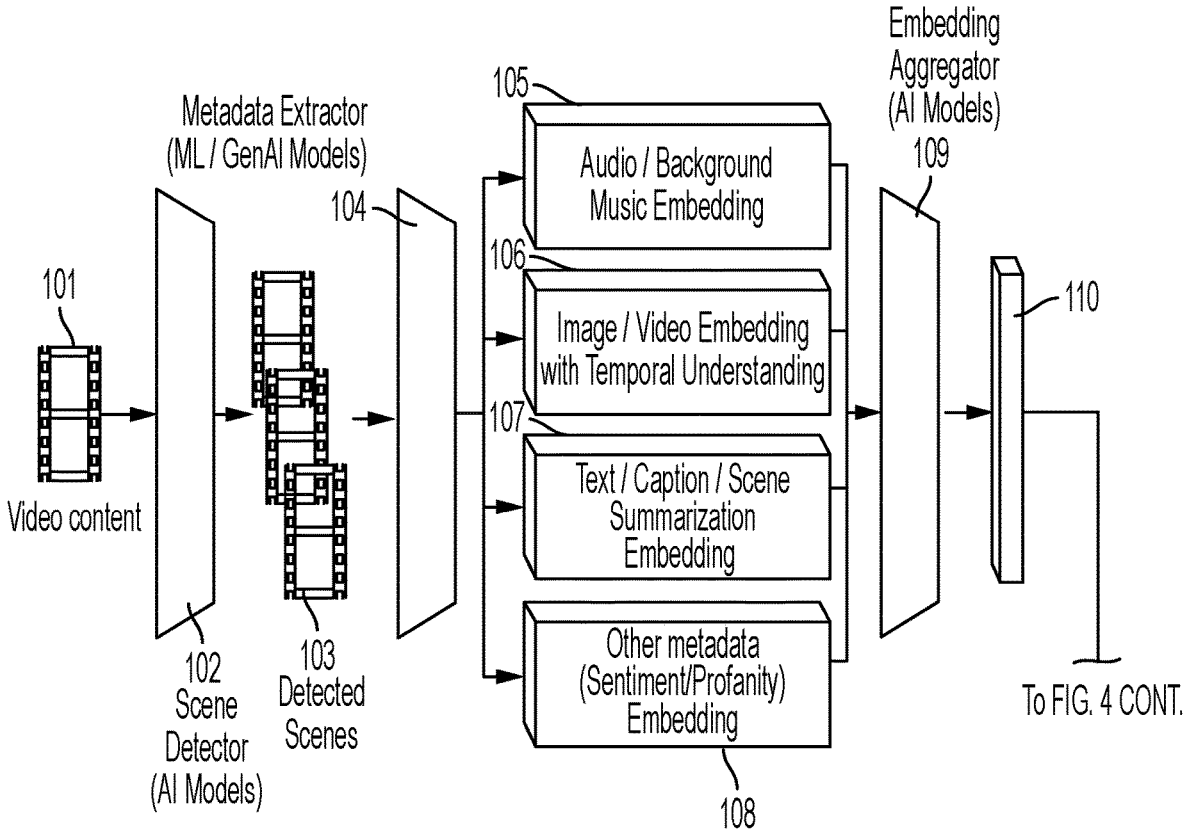
FIG. 4 shows an embodiment using video content to search metadata extracted from video content using a multimodal metadata extractor.
Figure 4:
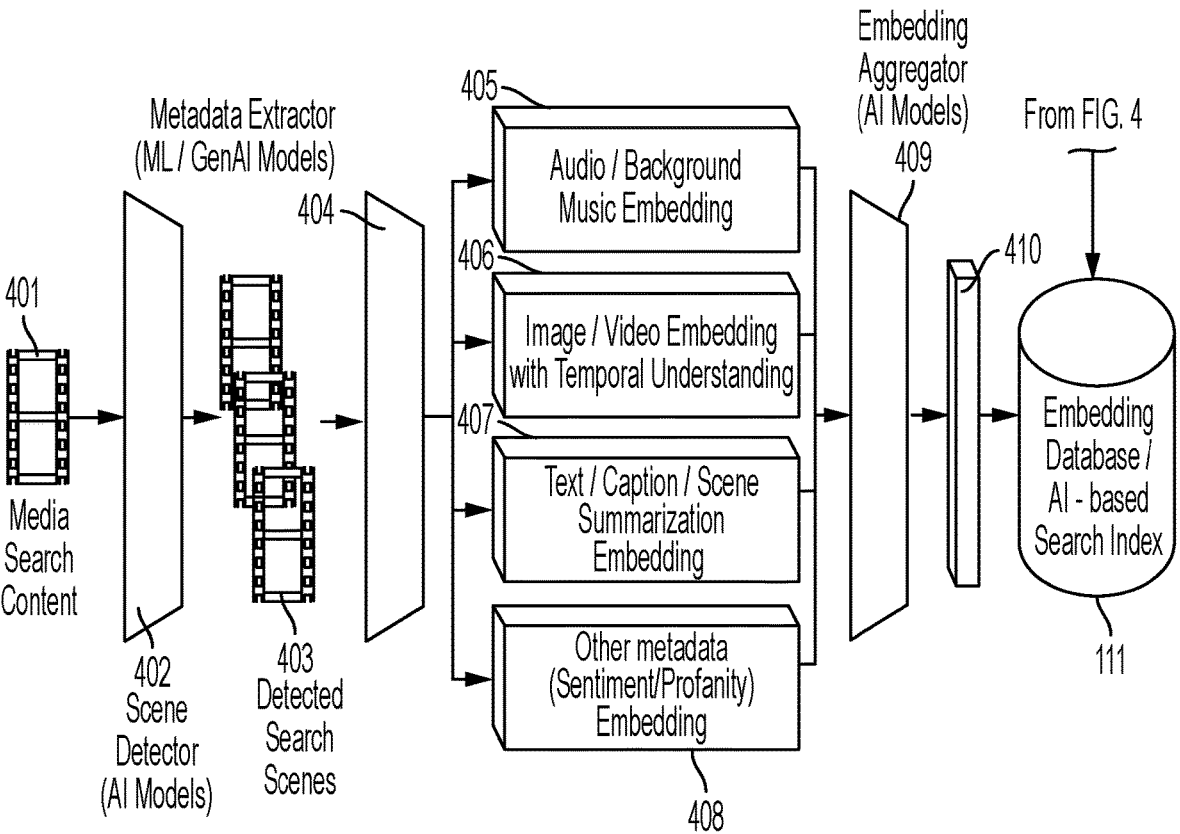

FIG. 4 shows an embodiment of a system that includes a multimodal metadata extractor for video content and a structure for searching and/or identifying content using video, image, audio and/or text queries. This system allows a user to identify video content that is close to or compatible with other creative content rather than requiring a text-based search as shown in FIG. 3. The system includes sub-system 400 for establishing a search vector 10. The search vector may be applied against an index database for a library of video content. The same search vector may be applied against a stream of video content.

The application may be useful for a system that intends to identify conditions that may present themselves in a live video stream. For example, in a security system, a user may wish to search for a particular occurrence, for example, a person or vehicle entering a gate or checkpoint and proceeding to a location other than a security office. The search content may be a staged video of a person or vehicle entering through a checkpoint and proceeding to unauthorized locations rather than a security office. The search may also be conducted by using video content of expected behaviors and searching for sequences that do not correlate to the expected behaviors.

Using or formulating explicit text queries to search for suitable shots in content, the system allows for free-form text, audio, video/image, music, and other inputs as queries. Another use case might be in the situation where an advertiser could use its own creative to select the best place in content to serve it. For example, during a TV program or movie that is streaming or broadcast, the advertiser could identify the correct time to insert its ad. There is no need for formulating explicit textual prompts or queries to find suitable shots for placing ads.

The search vector may be formulated using different modalities embedded using the same foundational models used to index the content stream. These embeddings can then be used to search the content for the highest similarities. The results can be aggregated post or pre-searched. The embeddings for different modalities can also be used to get a single representation using contrastive learning frameworks.

The search content input 401 is provided to a scene detector 402 operating in the same fashion as scene detector 102. Scene detector 402 may however be simplified to the extent that the application permits restricting video content search terms to a single shot or at least to an appropriately limited duration or complexity.

To the extent that the application permits multiple scenes in a video search, the scene detector may be considered to create multiple search terms. The system may be configured to cause a multi-scene search to look for content that includes each of the scenes, any of the scenes, or two or more of the scenes within a temporal limit. The scene boundaries define the detected scene 403. The detected scenes 403 are provided to a metadata extractor 404. The metadata extractor 404 may consider the content of the scenes individually according to one or more of the selected aspects anticipated to be potentially present in the content. FIG. 4 illustrates four aspects of search content processing and embedding. The aspects illustrated in FIG. 4 are examples. Audio/Background Music embedding 405, Image/Video embedding with temporal understanding 406, Text/Caption/Scene Summation embedding 407, and other metadata (sentiment profanity) 408. Many more modes are possible, however, they may not be needed for a video content search application, depending on the objective of the contemplated search. The search term embeddings may be provided to an embedding aggregator 409 to generate aggregated search embeddings 410 for use as a search vector against content embeddings.

As shown in FIG. 4, the metadata obtained by multimodal extraction, as shown in FIGS. 1 and 2, may be generated in advance and stored in a database. Alternatively, the query may be formulated as described herein and applied against a stream of multimodal extracted metadata in real-time or near real-time. This system allows a user to identify video content that is close to or compatible with other creative content rather than requiring a text-based search as shown in U.S. patent application Ser. No. 18/581,329, and as illustrated in FIG. 3. The system includes a sub-system 400 for establishing a search vector 410. The search vector may be applied against an index database for a library of video content. The same search vector may be applied against a stream of video content.

Figure 5:
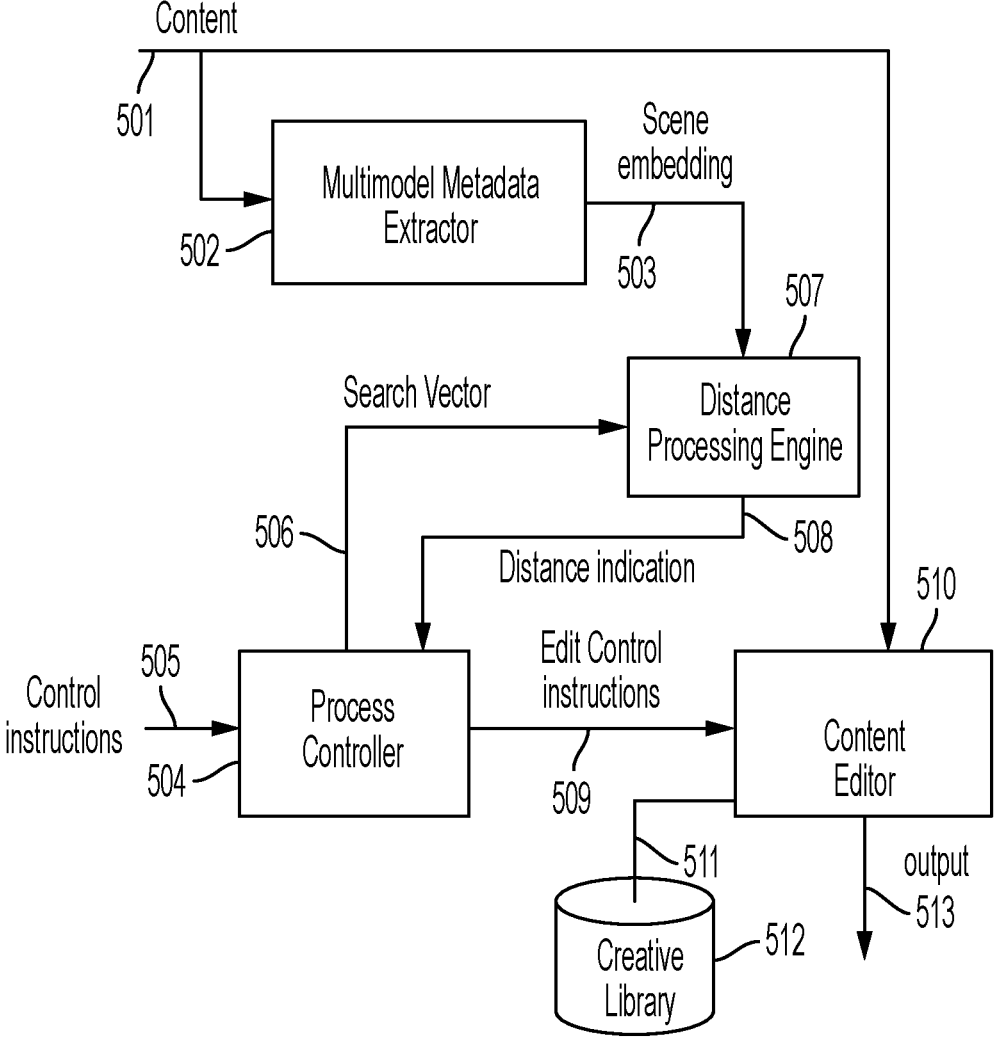
FIG. 5 shows a system architecture for taking advantage of a deep understanding of content.

FIG. 5 shows a system architecture for taking advantage of a deep understanding of content, including video and/or other content. Video content of 501 is provided to the system. Depending on the application, architecture, and demands in terms of computational complexity and timing, all data processed through the system may be in the form of a data stream or may be stored, accessed, and used by the system as needed. The system may be implemented in a hybrid approach whereby processing is performed as demanded with results stored in buffers. In this manner, processing need not be synchronized with content output requirements. The system may utilize libraries and databases to preprocess and store content, including subject video content, operational parameters, and creatives, which are used to modify video content processed by the system. The video content 501 may originate from a database or content library or be a video stream.

The multimodal metadata extractor develops data serving as an index representing a deep understanding of the video content. An embodiment of the multimodal metadata extractor 502 is illustrated in FIG. 1 and described in connection therewith. The multimodal metadata extractor 502 outputs scene embeddings 503 generated by artificial intelligence processing techniques. The scene embeddings 503 are associated with the video content 501 processed by the multimodal metadata extractor 502. The association may, for example, be affected by video content 501 timestamps indexed against or incorporated into the scene embeddings 502. Alternatively, the scene embeddings 503 may be combined with the video content 501. The process controller 504 is illustrated schematically in FIG. 5. The process controller 504 may have different configurations depending on the intended application of the system. Embodiments of the process controller 504 are described hereinafter. In addition, aspects of the embodiments illustrated in FIGS. 3 and 4 include aspects of embodiments of process controller 504. Process control instructions 505 are provided to process controller 504. The process control instructions 505 may be generated manually or, particularly in a production environment, generated in an automated fashion. The process controller 504 may have a search vector output 506. The search vector output 506 may be generated based in part on process control instructions 505. The process controller 504 may be configured with inputs in the form of text queries and may have an embedding extractor 302, query embedding 303, and optionally textual inversion 304, as shown in FIG. 3. Alternatively, or in addition, the process controller may be configured with inputs in the form of media content queries 401 and having a metadata extractor 404, one or more embeddings 405, 406, 407, 408. If more than one embedding is extracted, an embedding aggregator 409 may be included to generate an aggregated search vector 410 as shown in FIG. 4. The system may be configured to permit search content composed of multiple scenes, in which case, a scene detector 402 may be included to break video search content 401 into multiple detected search scenes 403 and the multiple scenes may be logically combined as search terms according to control instructions 505. The search content may be any media content. In addition to video search content, the search content may be audio content, images, text, or other metadata concerning content.

The process controller 504 may generate an output of one or more search vectors 506. The search vector(s) 506 is provided to distance processing engine 507. The distance processing engine 507 may determine the distance between the search vector 506 and relevant portions of the scene embeddings 503. In many applications, an identical match between a search vector 506 and scene embeddings 503 is not necessary, and indeed is not expected. A match is indicated when the distance between the search vector 506 and the relevant aspects of scene embeddings 503 falls below a threshold. The threshold may be set to a default level or may be provided and/or modified as part of the control instructions 505.

The distance processing engine 507 has an output 508 connected to the process controller 504. The output 508 of the distance processing engine may represent a distance between a search vector 506 and scene embeddings 503. In this case, the process controller 504 may make a determination if a threshold distance is satisfied. Alternatively, the distance processing engine 507 may compare the distance to a threshold and issue a determination indicating whether the threshold is satisfied at output 508 to process controller 504. Depending on the control instructions 505 and the distance processing engine output 508, the process controller 504 provides edit control instructions 509 to a video content editor 510. The video content editor 510 may alter the video content in accordance with the content instructions 509.

Embodiments of the video content editor 510 are described hereafter. According to one embodiment, the edit control instructions 509 may include creative material or include instructions to retrieve creative content 511 from a creative library 512. The creative content 511 may be supplemental information for the purpose of modifying the video content 501 by the video content editor 510 to generate a video output 513. The output 513 may be streamed for consumption or stored for later consumption. According to According to one embodiment, the edit control instructions 509 may include creative material or include instructions to retrieve creative content 511 from a creative library 512. The creative content 511 may be supplemental information for the purpose of modifying the video content 501 by the video content editor 510 to generate a video output 513. The output 513 may be streamed for consumption or stored for later consumption. According to a hybrid approach, the video content editor 510 does not modify the video content 501 strictly in sequential order. Such a situation may occur if temporal clustering is utilized and all similar shots are modified together thereby causing the remaining shots to be processed out of sequential order. In such situations, the processed video may be accumulated in a buffer and output from the buffer in sequential order. Such an operation may result in computational efficiencies.

According to one embodiment, the edit control instructions 509 may include creative material or include instructions to retrieve creative content 511 from a creative library 512. The creative content 511 may be supplemental information for the purpose of modifying the video content 501 by the video content editor 510 to generate a video output 513. The output 513 may be streamed for consumption or stored for later consumption.

An example of the aforementioned hybrid approach may be a system where the video content editor 510 does not modify the video content 501 strictly in sequential order. Such a situation may occur if temporal clustering is utilized and all similar scenes by modification are modified together thereby causing the remaining scenes to be processed out of sequential order. In such situations, the processed video may be accumulated in a buffer and output from the buffer in sequential order. Such an operation may result in computational efficiencies.

The insertion of contextual advertising may be accomplished by an embodiment in accordance with FIG. 5. An advertiser or agency may submit control instructions 505 to the process controller 504. The process controller 504 may formulate a search vector 506 on the basis of the control instructions. For example, the search vector may be designed to identify a commercial break in content suitable for the insertion of a Porsche advertisement. In this case, the control instructions would be to formulate a search vector representation of a high-speed chase involving a Porsche having a positive result for the Porsche (escape or first-place finish and not ending in a crash of the Porsche). The search vector 506 is compared to scene embeddings 503 by the distance processing engine 507. If the distance is below a threshold level, a threshold match indication 508 may be provided to the process controller 504 which then issues edit control instructions 509 to the video content editor 510. The video content editor 510 may retrieve a selected advertisement 511 from the creative library. The video content editor 510 may then insert the Porsche advertisement 511 retrieved from the creative library 512 into the video content 501 to be included in the commercial break in the video content 501 and incorporated into output stream 513. Generally, this example identifies a suitable advertising opportunity and then modifies the video content to include additional creative materials i.e., the advertisement in the video stream.

The above-described process for overlaying an ad or sponsorship into video content is performed in essentially the same manner except that the creative 511 retrieved from the creative library 512 is superimposed over the video content 501 by video content editor 510 and incorporated into the video content output stream 513 when the advertising opportunity consistent with control instructions 505 is identified.

Figure 6:
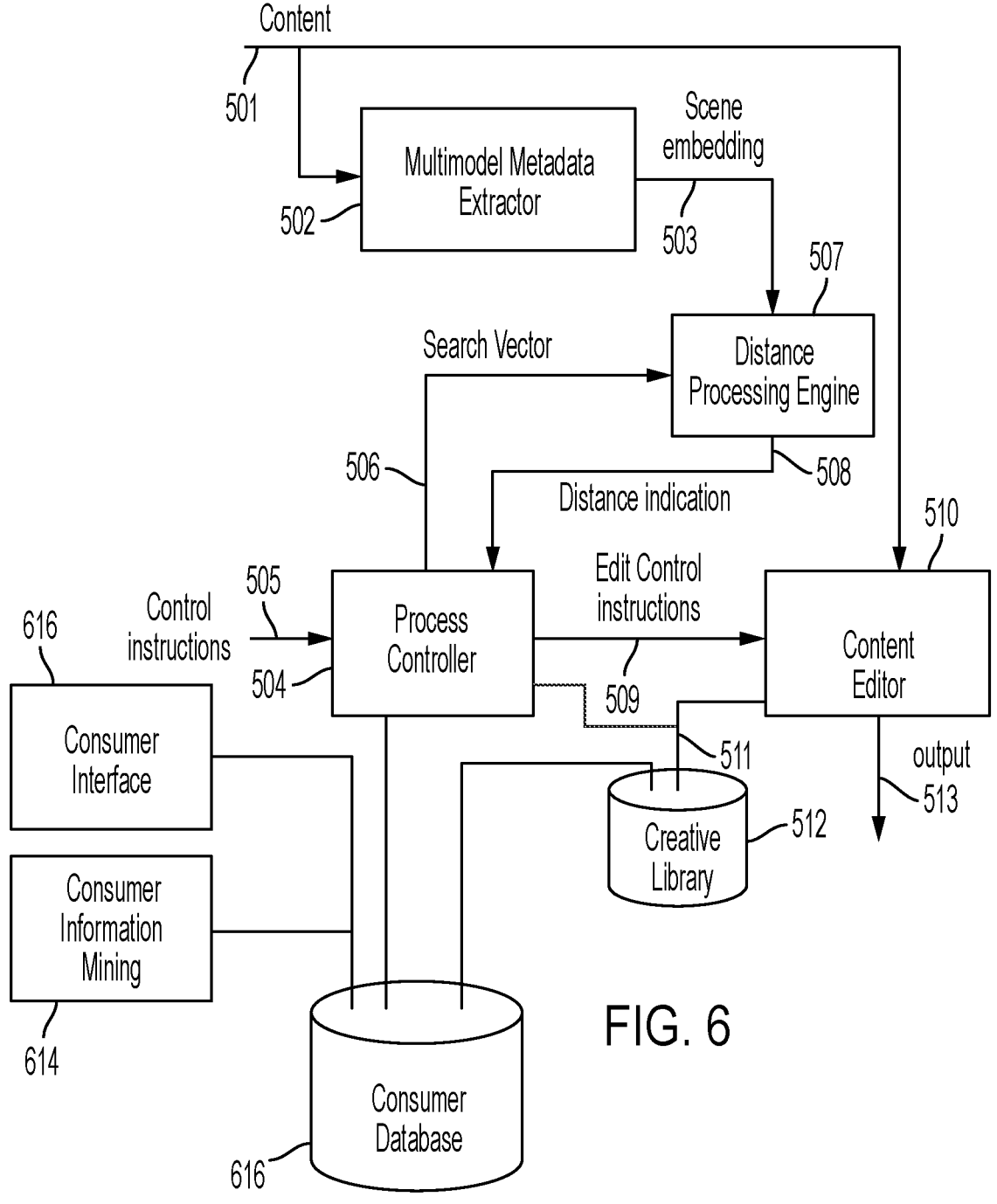
FIG. 6 shows a system that may be utilized to generate contextual advertising with dynamically customized and/or generated creatives using Generative AI.

The system according to FIG. 6 may be utilized to generate contextual advertising with dynamically customized and/or generated creatives using Generative AI. The video content editor 510 may use Generative AI techniques to edit the content. The Generative AI techniques may rely on templates retrieved from creative library 512. Instructions to the video content editor 510 may be the edit control instructions 509 generated by the process controller 504. The process controller 504 utilizes the scene embeddings 503 to provide edit control instructions 509 which are consistent with the content. The process controller 504 may also rely on viewer information 614 stored in viewer database 615 to generate edit control instructions 509 for the video content editor 510. The video content editor 510 may then utilize Generative AI techniques with the information contained in the creative library 512 to generate an appropriate output 513 which may be dynamically based on the content or viewer information.

The system systemically illustrated in FIG. 6 may be configured to replace aspects of a content stream dynamically based on consumer information and/or consumer preferences using generative AI techniques. The system may store information regarding a consumer in consumer database 615. The information in the consumer database 615 may be collected directly from the consumer, for example, to include consumer-provided preferences. The consumer-provided preferences may be input by a consumer through consumer interface 616. The consumer interface 616 may use a consumer ID to coordinate consumer information. The consumer information may include an IP address. The IP address may be utilized to identify various screens or other players utilized by a consumer such as a computer monitor, a set-top box/television, or a tablet all receiving data through a WI-FI router IP address. The process controller 504 may be connected to consumer database 615 and the multimodal metadata extractor 502. The controller instructions 505 to the process controller 504 may be configured to identify elements of consumer information dynamically to incorporate into a search vector to identify opportunities for content modification as described above. Alternatively, or in addition, the consumer information, images, audio, and/or video identified by a user may be stored in the creative library 512 for use by the system. The process controller 504 formulates a search vector 506 utilizing control instructions 505 and optionally consumer information. The search vector 506 is provided to distance processing engine 507. Upon identification of a suitable opportunity under control instructions 505, the process controller 504 issues edit control instructions 509 to a content editor 512. The content editor 510 may utilize generative AI techniques to modify the content stream 501. The content editor 510 may access creative library 512 for any creative information needed to execute the edit control instructions 509. The process control instructions are utilized to control the identification of an opportunity to modify the content stream and may be provided to limit aspects of preference-driven modifications.

The system shown in FIG. 5 may be implemented in a way to seamlessly stitch fully contextual short ads to content for immersive advertisement. The process controller 504 may receive control instructions 505 instructing it to identify opportunities in the video content for insertion of the desired material. Depending on the control instructions 505, the opportunity may be the identification of a scene having the desired context and features which admits to using generative AI techniques for the modification within the video content stream 501 or by insertion of additional frames to the video content. The process control 504 formulates search vector 506 to be consistent with scene embeddings of 503 of the video content 501 generated by the multimodal metadata extractor 502. The distance processing engine 507 may be configured to generate a representation of the distance at its output 508 thereby allowing process controller 504 to select the suitable opportunity within the video content. The process controller 504 may be configured to determine if the distance is within its margin for identifying an opportunity. Alternatively, the determination may be performed by the distance processing engine 507, and the output 508 of the distance processing engine 507 indicates the identification of a suitable opportunity.

Creative library 512 may include creatives representing content inventory available for incorporation into the video content 501. The process controller 504 may access the creatives for use as media queries to be processed to generate search vectors, for example, as described in connection with FIG. 4.

The process controller may formulate edit control instructions 509 for video content editor 510 to make the desired edits in the video content 501. The modified video content 513 is provided at the output of video content editor 510. The video content editor of 510 may utilize generative AI techniques to modify the video content 501.

The techniques, processes, and apparatus described may be utilized to control the operation of any device and conserve the use of resources based on conditions detected or applicable to the device or otherwise made available for further processing.

The system is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of metadata extraction have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A system for contextual modification of content based on multimodal extraction of metadata from said content comprising:

a metadata extractor processing one or more scenes in said content to extract metadata corresponding to multiple extraction modes, and a first embedding model for each extraction mode wherein an aggregated embedding model responsive to said extracted metadata for each mode formulates an aggregated embedding;

a process controller including an embedding extractor responsive to a control input wherein said control input specifies one or more features defining a content modification opportunity and wherein said embedding extractor includes a second embedding model coordinated with said first embedding model for one or more said multiple extraction modes to generate an opportunity embedding in the form of a vector;

a vector comparison processor for determining the distance between said opportunity embedding and said aggregated embedding to determine a content modification opportunity when said distance is within a threshold;

wherein said processor controller is responsive to said vector comparison processor to generate edit control instructions indicating a modification of said content upon detection of said content modification opportunity; and a content editor responsive to said edit control instructions for a content modification opportunity to modify said content and having a modified content output wherein said content editor uses generative AI techniques to modify said content by replacing an element appearing within said content during said content modification opportunity with an element correlated with said element appearing in said content.

2. The system for contextual modification of content based on multimodal extraction of metadata from said content according to claim 1 wherein said element appearing during said content modification opportunity represents an object that appears in one or more frames of said content and wherein said element correlated with an element of said content represents an alternative object and said generative AI techniques exercise at least an area of said one or more frames corresponding to said element and inserting said element correlated with said element appearing in said content in said one or more frames.

3. The system for contextual modification of content based on multimodal extraction of metadata from said content according to claim 2 wherein said generative AI techniques operate to fill any gaps between said element appearing within said content during said content modification opportunity and said element correlated with said element appearing in said content.

4. The system for contextual modification of content based on multimodal extraction of metadata from said content according to claim 3 further comprising a creative library, wherein said creative library stores one or more templates creatives and said edit control instructions specify said generative AI techniques to said template creative retrieved from said creative library application for use by said content editor.

5. The system for contextual modification of content based on multimodal extraction of metadata from said content according to claim 4 wherein said edit control instructions cause said content editor to apply said generative AI techniques based on triggering embeddings.

6. The system for contextual modification of content based on multimodal extraction of metadata from said content according to claim 5 wherein said edit control instructions include triggering embeddings.

7. The system for contextual modification of content based on multimodal extraction of metadata from said content according to claim 6 wherein said triggering embeddings are based in part on said aggregated embeddings.

8. The system for contextual modification of content based on multimodal extraction of metadata from said content according to claim 7 wherein said triggering embeddings are based in part on metadata concerning viewers, and further comprising a viewer database for viewer metadata.

9. The system for contextual modification of content based on multimodal extraction of metadata from said content according to claim 8 wherein said edit control instructions are dynamically generated based on said viewer database and scene content embeddings in said modified content.

10. The system for contextual modification of content based on multimodal extraction of metadata from said content according to claim 9 further comprising a modification selection server responsive to said opportunity to select a modification to apply to said content.

11. The system for contextual modification of content based on multimodal extraction of metadata from said content according to claim 10 wherein said modification selection server is a competitive bid processor.

12. The system for contextual modification of content based on multimodal extraction of metadata from said content according to claim 1 further comprising a modification selection server responsive to said opportunity to select a modification to apply to said content wherein said modification selection server is a competitive bid processor wherein said element appearing during said content modification opportunity represents an object that appears in one or more frames of said content and wherein said element correlated with an element of said content represents an alternative object and said generative AI techniques insert one or more frames of modified content into said content at said content modification opportunity.

13. The system for contextual modification of content based on multimodal extraction of metadata from said content according to claim 12 wherein said generative AI techniques operate to fill any gaps between said element appearing within said content during said content modification opportunity and said element correlated with said element appearing in said content.

14. The system for contextual modification of media content based on multimodal extraction of metadata from said content according to claim 13 wherein said edit control instructions cause said content editor to apply said generative AI techniques based on triggering embeddings.

15. The system for contextual modification of content based on multimodal extraction of metadata from said content according to claim 14 wherein said edit control instructions include triggering embeddings.

16. The system for contextual modification of content based on multimodal extraction of metadata from said content according to claim 15 wherein said triggering embeddings are based in part on said aggregated embeddings.

17. The system for contextual modification of content based on multimodal extraction of metadata from said content according to claim 16 wherein said triggering embeddings are based in part on metadata concerning viewers, and further comprising a viewer database for viewer metadata.

18. The system for contextual modification of content based on multimodal extraction of metadata from said content according to claim 17 wherein said edit control instructions are dynamically generated based on said viewer database and scene content embeddings in said modified content.

* * * * *